US011166050B2

(12) United States Patent
Paiement et al.

(10) Patent No.: US 11,166,050 B2
(45) Date of Patent: Nov. 2, 2021

(54) METHODS, SYSTEMS, AND DEVICES FOR IDENTIFYING VIEWED ACTION OF A LIVE EVENT AND ADJUSTING A GROUP OF RESOURCES TO AUGMENT PRESENTATION OF THE ACTION OF THE LIVE EVENT

(71) Applicant: AT&T Intellectual Property I, L.P., Atlanta, GA (US)

(72) Inventors: Jean-Francois Paiement, Sausalito, CA (US); Lee Begeja, Gillette, NJ (US); David Crawford Gibbon, Lincroft, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/711,082

(22) Filed: Dec. 11, 2019

(65) Prior Publication Data
US 2021/0185363 A1    Jun. 17, 2021

(51) Int. Cl.
| | | |
|---|---|---|
| H04N 21/2187 | (2011.01) | |
| H04N 21/422 | (2011.01) | |
| H04N 21/81 | (2011.01) | |
| H04N 21/2668 | (2011.01) | |
| H04N 21/218 | (2011.01) | |
| H04L 29/08 | (2006.01) | |
| G06T 11/00 | (2006.01) | |
| G16Y 20/10 | (2020.01) | |
| G16Y 10/30 | (2020.01) | |

(52) U.S. Cl.
CPC ......... *H04N 21/2187* (2013.01); *G06T 11/00* (2013.01); *H04L 67/12* (2013.01); *H04N 21/21805* (2013.01); *H04N 21/2668* (2013.01); *H04N 21/42202* (2013.01); *H04N 21/8146* (2013.01); *G16Y 10/30* (2020.01); *G16Y 20/10* (2020.01)

(58) Field of Classification Search
CPC ............. H04N 21/266; H04N 21/4307; H04N 21/21805; H04N 21/2187; H04N 21/816; H04N 21/2665; H04N 21/6587
See application file for complete search history.

(56) References Cited

U.S. PATENT DOCUMENTS

| | | | | |
|---|---|---|---|---|
| 10,341,537 | B2 * | 7/2019 | Sarkar ................. | H04N 13/279 |
| 2002/0049566 | A1 * | 4/2002 | Friedrich ............ | G05B 19/409 |
| | | | | 702/188 |

(Continued)

*Primary Examiner* — Jason Salce
(74) *Attorney, Agent, or Firm* — Guntin & Gust, PLC; Jay Anderson

(57) ABSTRACT

Aspects of the subject disclosure may include, for example, obtaining a first group of video content streams of an event, determining a first point of view of a plurality of audience members of the event, and selecting a first portion of the first group of video content streams of the event according to the first point of view of the plurality of audience members. Further aspects can include aggregating the first portion of the first group of video content streams resulting in first aggregated video content, generating first augmented reality content from the first aggregated video content according to the first point of view, and providing the first augmented reality content to a communication device. The communication device can present the first augmented reality content. Other embodiments are disclosed.

20 Claims, 16 Drawing Sheets

(56) References Cited

U.S. PATENT DOCUMENTS

| | | | |
|---|---|---|---|
| 2004/0130567 A1* | 7/2004 | Ekin | G11B 27/034 |
| | | | 715/723 |
| 2009/0087161 A1* | 4/2009 | Roberts | H04N 21/8549 |
| | | | 386/282 |
| 2012/0293506 A1* | 11/2012 | Vertucci | G06N 3/04 |
| | | | 345/419 |
| 2013/0083003 A1* | 4/2013 | Perez | A63F 13/79 |
| | | | 345/419 |
| 2016/0205654 A1* | 7/2016 | Robinson, Jr. | G01S 1/02 |
| | | | 455/456.3 |
| 2016/0295246 A1* | 10/2016 | Laksono | H04N 5/247 |
| 2016/0343168 A1* | 11/2016 | Mullins | G06F 3/015 |
| 2017/0006328 A1* | 1/2017 | Verticchio | H04N 21/2187 |
| 2017/0092220 A1* | 3/2017 | Mullins | G06F 3/011 |
| 2017/0264936 A1* | 9/2017 | Depies | G06T 19/006 |
| 2017/0353582 A1* | 12/2017 | Zavesky | H04L 67/327 |
| 2018/0161682 A1* | 6/2018 | Myhill | A63F 13/60 |
| 2019/0089456 A1* | 3/2019 | Sudarsan | H04M 1/72412 |
| 2019/0107845 A1* | 4/2019 | Kaine | G05D 1/0022 |
| 2020/0226388 A1* | 7/2020 | Ghessassi | G06K 9/00335 |
| 2020/0285252 A1* | 9/2020 | Gurdan | B64C 39/02 |

\* cited by examiner

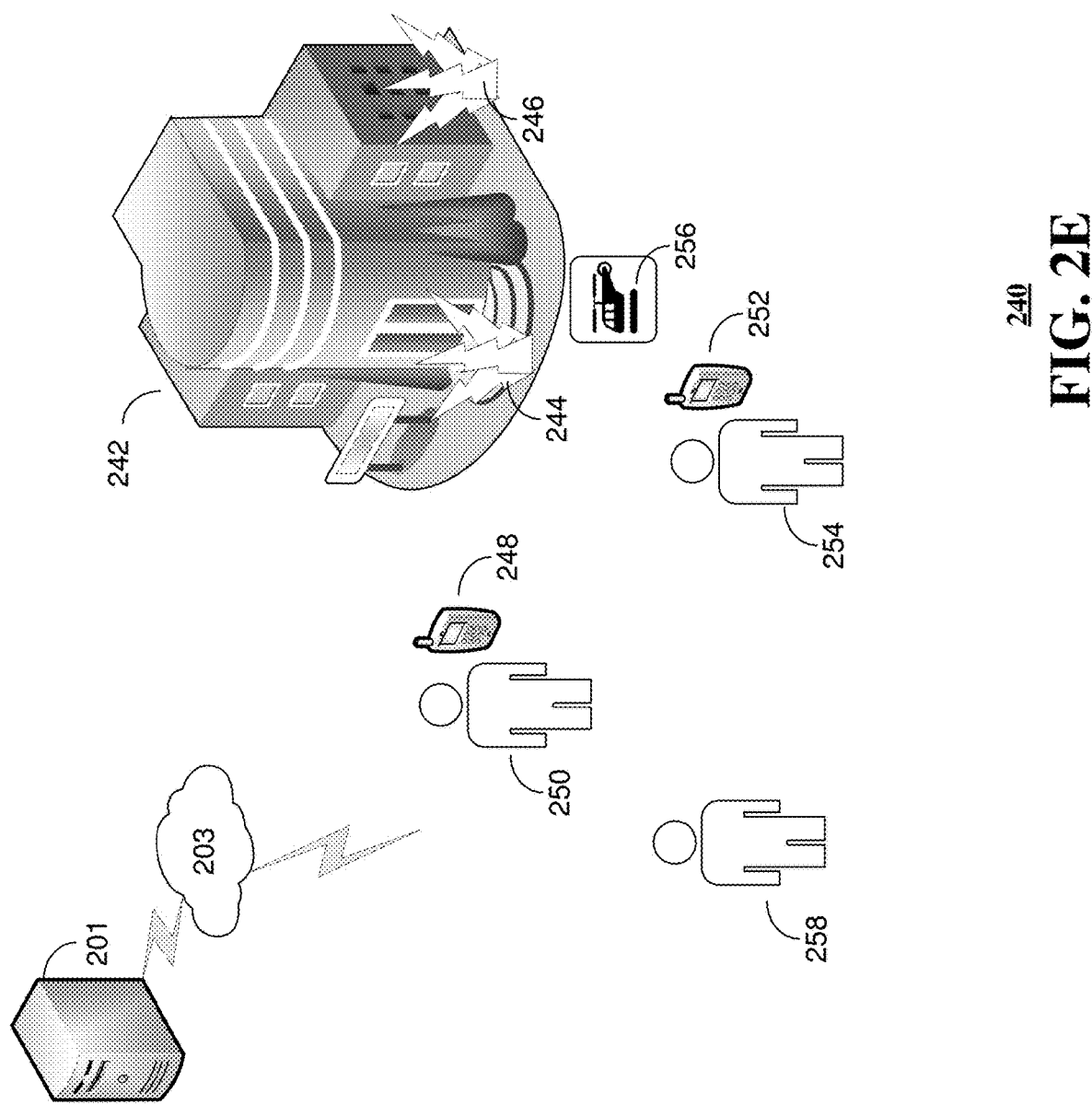

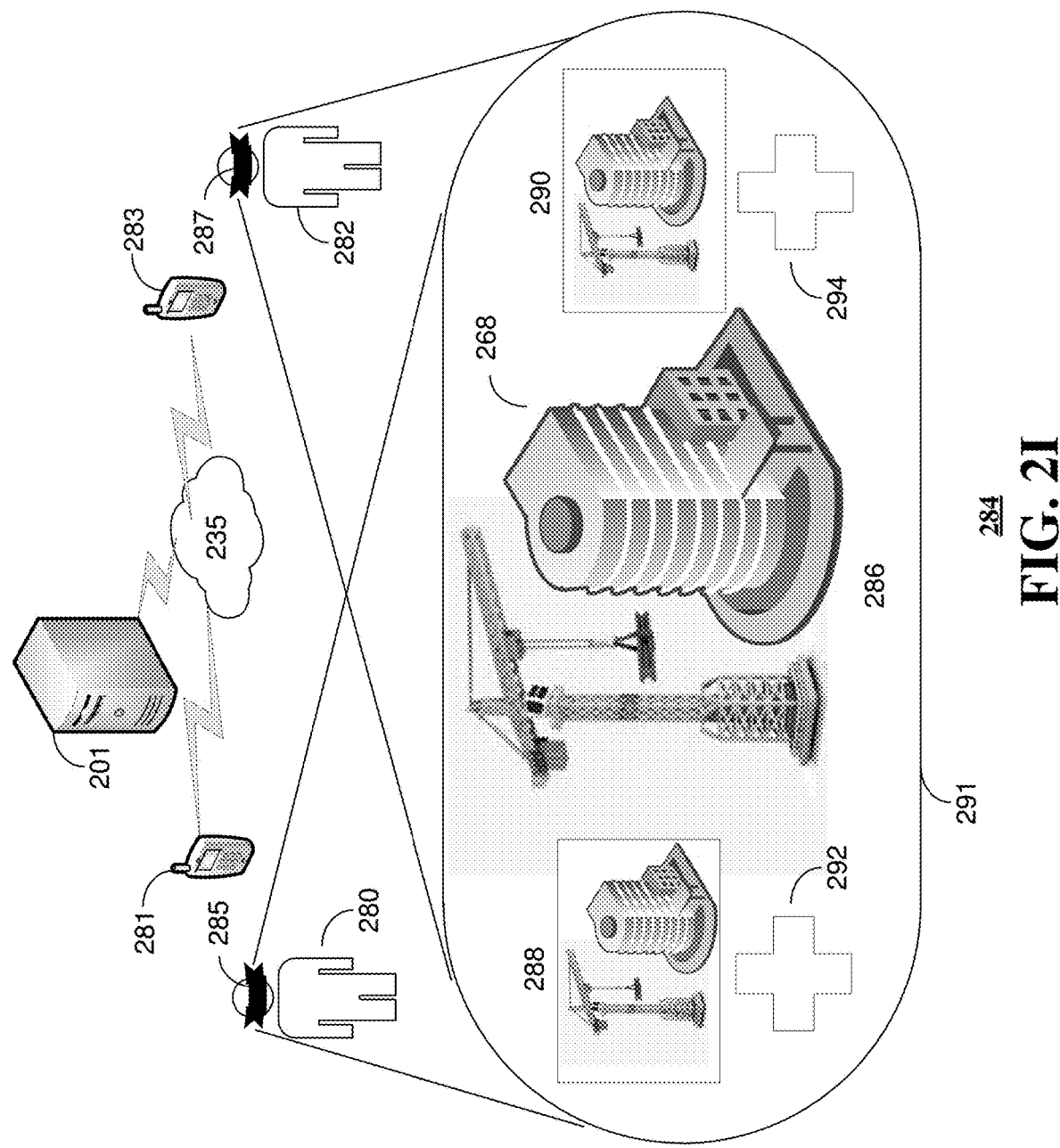

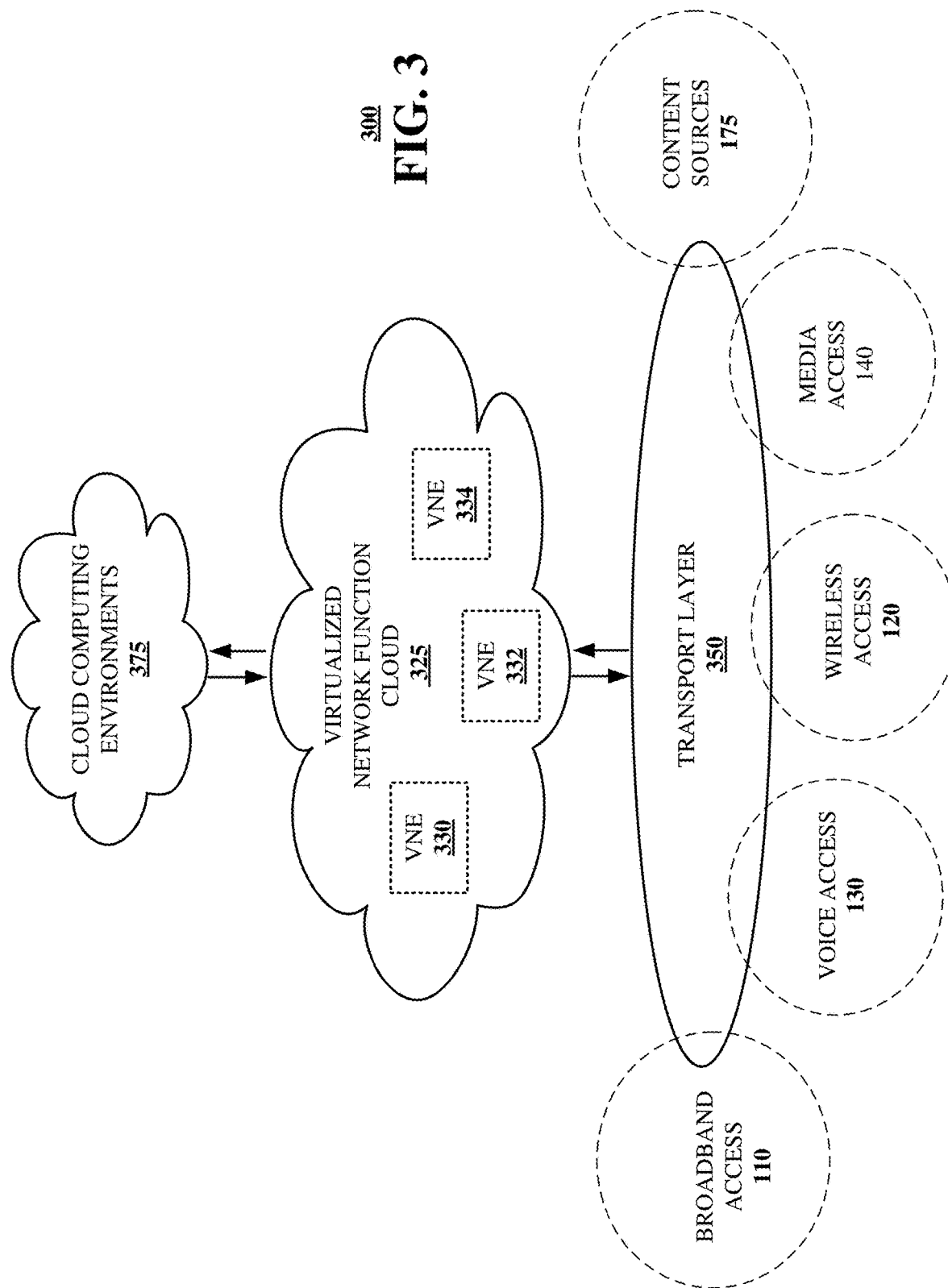

METHODS, SYSTEMS, AND DEVICES FOR IDENTIFYING VIEWED ACTION OF A LIVE EVENT AND ADJUSTING A GROUP OF RESOURCES TO AUGMENT PRESENTATION OF THE ACTION OF THE LIVE EVENT

FIELD OF THE DISCLOSURE

The subject disclosure relates to methods, systems, and devices for identifying viewed action of a live event and adjusting a group of resources to augment presentation of the action of the live event.

BACKGROUND

Traditional capturing of video content of a live event can include having a group of audience members capture video content of the live event and providing the captured video content to a video content service provider that can in turn provide the video content to a remote viewer. Further, sensors can obtain sensor information regarding the live event and the sensor information can be provided with the video content to the remote viewer. Both cameras and sensors are statically positions to capture images and obtain sensor information, respectively.

BRIEF DESCRIPTION OF THE DRAWINGS

Reference will now be made to the accompanying drawings, which are not necessarily drawn to scale, and wherein:

FIG. 2A-2J are block diagrams illustrating example, non-limiting embodiments of systems functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
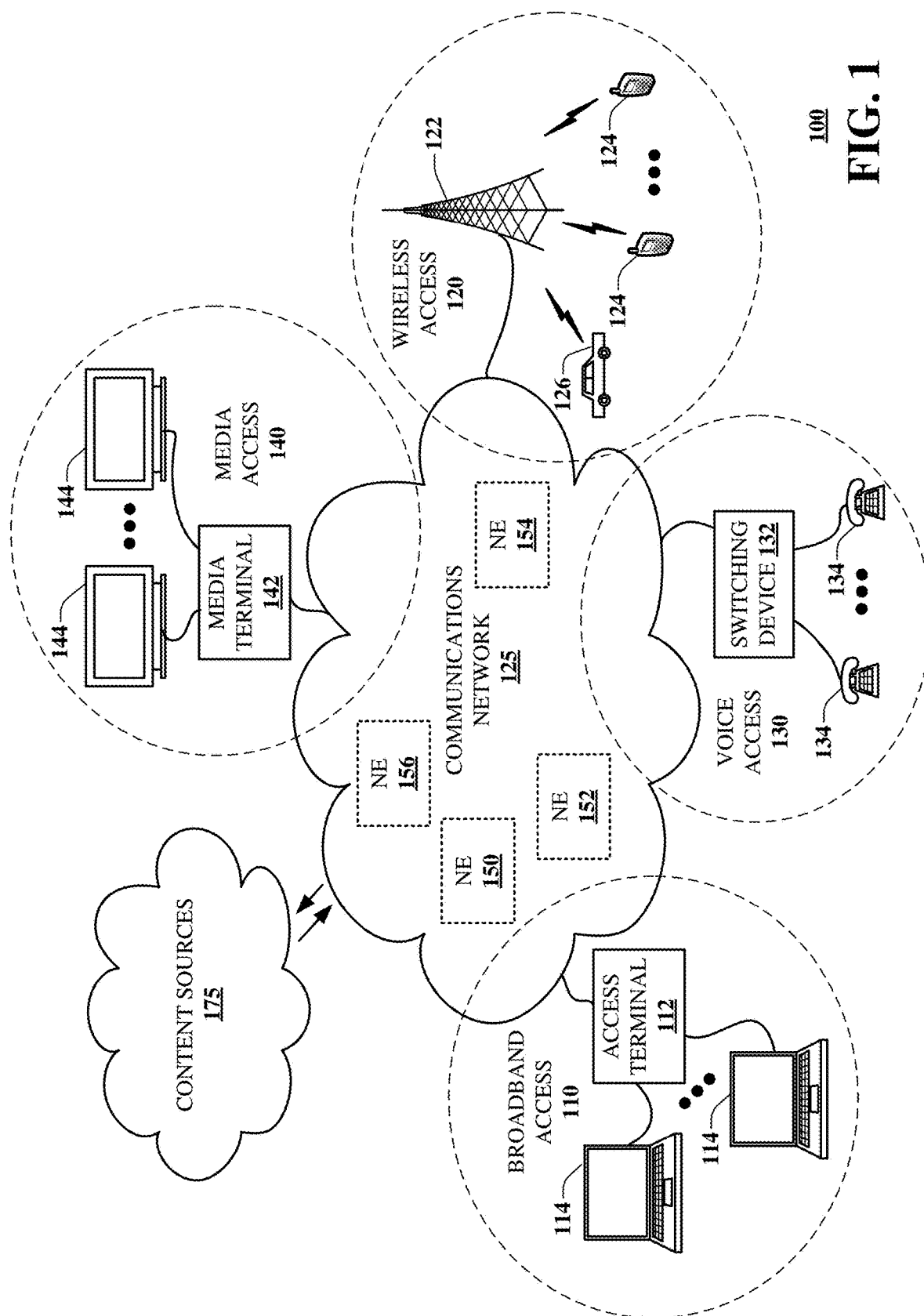
FIG. 1 is a block diagram illustrating an exemplary, non-limiting embodiment of a communications network in accordance with various aspects described herein.

The subject disclosure describes, among other things, illustrative embodiments for obtaining a first group of video content streams of an event, determining a first point of view of a plurality of audience members of the event, and selecting a first portion of the first group of video content streams of the event according to the first point of view of the plurality of audience members. Further embodiments can include aggregating the first portion of the first group of video content streams resulting in first aggregated video content, generating first augmented reality content from the first aggregated video content according to the first point of view, and providing the first augmented reality content to a communication device. The communication device can present the first augmented reality content. Other embodiments are described in the subject disclosure.

One or more aspects of the subject disclosure include a device comprising a processing system including a processor, and a memory that stores executable instructions that, when executed by the processing system, facilitate performance of operations. The operations can comprise obtaining a first group of video content streams of an event, determining a first point of view of a plurality of audience members of the event, and selecting a first portion of the first group of video content streams of the event according to the first point of view of the plurality of audience members. Further operations can include aggregating the first portion of the first group of video content streams resulting in first aggregated video content, generating first augmented reality content from the first aggregated video content according to the first point of view, and providing the first augmented reality content to a communication device. The communication device can present the first augmented reality content.

One or more aspects of the subject disclosure include a machine-readable medium, comprising executable instructions that, when executed by a processing system including a processor, facilitate performance of operations. The operations can comprise obtaining a first group of video content streams of an event, determining a first point of view of a plurality of audience members of the event, and selecting a first portion of the first group of video content streams of the event according to the first point of view of the plurality of audience members. Further operations can comprise obtaining a second group of video content streams from a first group of Internet of Things (IoT) devices, and aggregating the first portion of the first group of video content streams and the second group of video content streams resulting in first aggregated video content. Additional operations can comprise generating a first augmented reality content from the first aggregated video content according to the first point of view, and providing the first augmented reality content to a communication device. The communication device can present the first augmented reality content.

One or more aspects of the subject disclosure include a method. Further, the method can comprise obtaining, by a processing system including a processor, a first group of video content streams of an event, determining, by the processing system, a first point of view of a plurality of audience members of the event according to machine learning techniques, and selecting, by the processing system, a first portion of the first group of video content streams of the event according to the first point of view of the plurality of audience members. In addition, the method can comprise obtaining a first group of sensor information from a first group of Internet of Things (IoT) devices, aggregating, by the processing system, the first portion of the first group of video content streams and the first group of sensor information resulting in first aggregated video content, and generating, by the processing system, first augmented reality content from the first aggregated video content according to the first point of view. Also, the method can include providing, by the processing system, the first augmented reality content to a communication device. The communication device can present the first augmented reality content.

Referring now to FIG. 1, a block diagram is shown illustrating an example, non-limiting embodiment of a communications network 100 in accordance with various aspects described herein. For example, communications network 100 can facilitate in whole or in part obtaining video content streams of a live event, determining a point of view of audience members of the live event, and generating augmented reality content from the aggregation of the video content streams according to the point of view. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A-2J are block diagrams illustrating example, non-limiting embodiments of systems functioning within the communication network of FIG. 1 in accordance with various aspects described herein. Developing augmented reality (AR) platforms and content consumption systems are increasingly exposed to large, multi-user needs. For example, the inclusion of user generated content from a crowd member at a stadium can be selected for the best view of a championship game. Some embodiments that include AR, that aid highlighting, or marking, of objects or content in focus can be distracting (e.g. poorly constructed) or require rigorously predetermined objects of interested (e.g., a wall, a basket, a location) and often fail with respect to live environments. There can be a need for AR for situational awareness and observations of live activities. For example, a use case can include first responders leveraging AR capabilities (live video, situational awareness of rooms, etc.) to quickly determine data (either numerical or visual) that can be most relevant for one or more specific first responders. Machine learning (ML) techniques and observations from historical instances of a domain (e.g., watching a football game) can further be leveraged for workflow determination and ideal content selection. In one embodiment for a sporting event, one particular player may be a fan favorite and a machine learning model can be constructed to recognize his or her face, jersey, likeness, etc. and indicate a preference for that player's actions (or a sequence of seemingly unconnected actions—like zig-zag movements, spinning, then jumping—as automatically learned by a generative adversarial network (GAN)) whenever detected in play. In another embodiment for first responders, machine learning models may leverage visual classifiers for the intensity of a fire (e.g. deep neural networks trained to detect color, texture, motion, smoke, etc.) to predict awareness needs and subsequently correlate the historical intensity of a fire to actions that followed (e.g. soliciting more human or autonomous assistance for controlling the flames). Machine learning techniques can include supervised, semi-supervised, and unsupervised learning techniques for temporal sequences, including, but not limited to, neural networks, probabilistic models, and statistical time series models.

Embodiments described herein improve the quality of AR experiences in shared events (both large and small event spaces) and leverage the availability of multiple content feeds (streams). Some embodiments can be directed to spatial augmentation or best content discovery from points of view. These embodiments can include selection of optimal view/object from aggregated video content streams with not only passive stream forward but also using AR. Further, a specific instance or event that is localized for each user can be detected and presented on AR display. Other embodiments can be directed to selection of content stream or AR enhancement from action alignment workflow. These embodiments can include aggregation of content for an event, determine typical anomalous actions such that content switches can be performed preemptively (e.g., someone building siding of house needs to see adjacent views of framing as next step, switch to that view first). Further, these embodiments can include a heat map (for action or content) can be generated for the collective and projected to each individual display. Further embodiments can include coordinated Internet of Things (IoT) control from multiple points of view. These embodiments can include using localized positioning and user feedback that is weighted by their role, give collective IoT control commands (e.g., robot arm managed by community is raising a heavy rafter without complicated interactions or single liable expert).

One or more embodiments can include using content viewership and consumption positions and AR throughput measurements, preemptively determine ideal placement and network capabilities to better suit user need (e.g., building in advance of customer or activity need). Further, embodiments can include look-ahead of future activities and remote locations by coordination of multiple points of view for those individuals in a similar action, bridging multiple people who are not proximally located (e.g., networking across a smart city). For example, an action can be parking such that views from active drivers can be aggregated and pooled for more/less activity as need by other workflow. In addition, embodiments can include 5G (and beyond) enhancements for high bandwidth and low-latency between devices. This capability demonstrates use of private 5G slices between different users and devices, low intra-user latency for feedback and correlation of visuals and gestures, and improve visual odometry (scale of objects based on other objects within visual content) with enhanced location information from 5G small cell nodes. Also, embodiments can include enhanced optics for users and automated vehicles using methods like view completion or x-ray (e.g. combining the views of multiple disparate cameras such that occlusions and field of view limitations are removed), occlusion removal, zoom-in (using up-sampled pixel dimensionality from other feeds). Further, embodiments can include calibration-free coordinated control of an IoT or other robotic appliance through proximity-weighted motions or visual contributions of multiple users (e.g., spreading a lifting task between multiple people/devices without first indicating the number of contributors or distance to object relative weighting/importance of each contributor).

One or more embodiments can include use cases directed to content guidance that includes stadium view and consolidation, x-ray view that includes first responder for x-ray view and guidance to a need (heat map), joint control of an environment or central object that can include robotic cameras in stadium, light intensity, multi-user interaction for one or more automated devices or robots, and next action prediction assistance with odds and statistical fault detection for physical activities.

One or more embodiments can include fallback of autonomous vehicle failure with coordinated control. Some embodiments can include the system producing guidance for next actions in an autonomous vehicle based on prior observations from users/people who were controlling (e.g., driving) the vehicle previously to avoid anomalous conditions (e.g., riding into center of a road or missing critical stop signs or traffic signals). Other embodiments can include optimizing the automatic and beneficial deployment of sensors (e.g., cameras) and antenna/network tower positioning based on utilization of the AR system. Further, systems can determine both the need for capture devices as well as heavy load conditions (where people typically engage for high-speed, low-latency needs) to enable new functionality and improve user AR experience. Additional embodiments can include a system being connected to autonomous IDAS (short range multiple antennas for cellular data)/antenna/robotic components to reorganize them based on the needs of the system (e.g., better vantage point) for a stadium or high-people capacity environment. Also, embodiments can include coordination of actions to indicate needs for enhanced and just-in-time supply management. Further, such systems can determine via AR usage that someone is in the process of building a home or have an emergency condition arise (e.g., an injury but no nearby medical supplies). Further embodiments can include city-wide observations from different points of view for multiple viewers to co-spot and track an object from afar (e.g., a fire on a hillside, a UAV that is simultaneously controlled, etc.)

One or more embodiments can include content aggregation and spatial referencing, detecting relevant regions for each viewer/user and appropriately highlight that region in their view instead of forcing a passive stream from the aggregate or another alternate source (e.g., highlighting the players that everyone is viewing but doing from the perspective of each viewer). Further embodiments can include derivation of heat maps for a single viewer using aggregated views. These heat maps can come from where a significant portion of the action for a domain (e.g., running in sports, fire entropy for first responder, etc.) or from the viewed content streams (e.g., significant portion of people staring at a single object). Additional embodiments can include using visual data to execute odometry techniques such that the spatial proximity and awareness of individuals can be automatically determined without prior calibration or reliance on other localization frameworks (e.g., location, a point cloud 3D mapping service, etc.). Also, embodiments can include methods for detection and determination of common and anomalous actions (represented as states in the proposed workflow) as well as analyzing input across prior instances for this domain, and looking at visually unique items (or visually unique viewer gaze orientation) to determine unique events. Further embodiments can include swarm or multi-person control of a single IoT or environment component by evaluated contribution and role-based importance. For example, multiple people can co-control a robot that is placing heavy piece of equipment. Additional embodiments can include an enabler for view completion (or x-ray), occlusion removal, zoom-in using up-sampled pixel dimensionality from other feed with computational combination of multiple views. Further, it can be visualized as either a heads-up display (HUD) or more interactive capability.

Figure 2A:
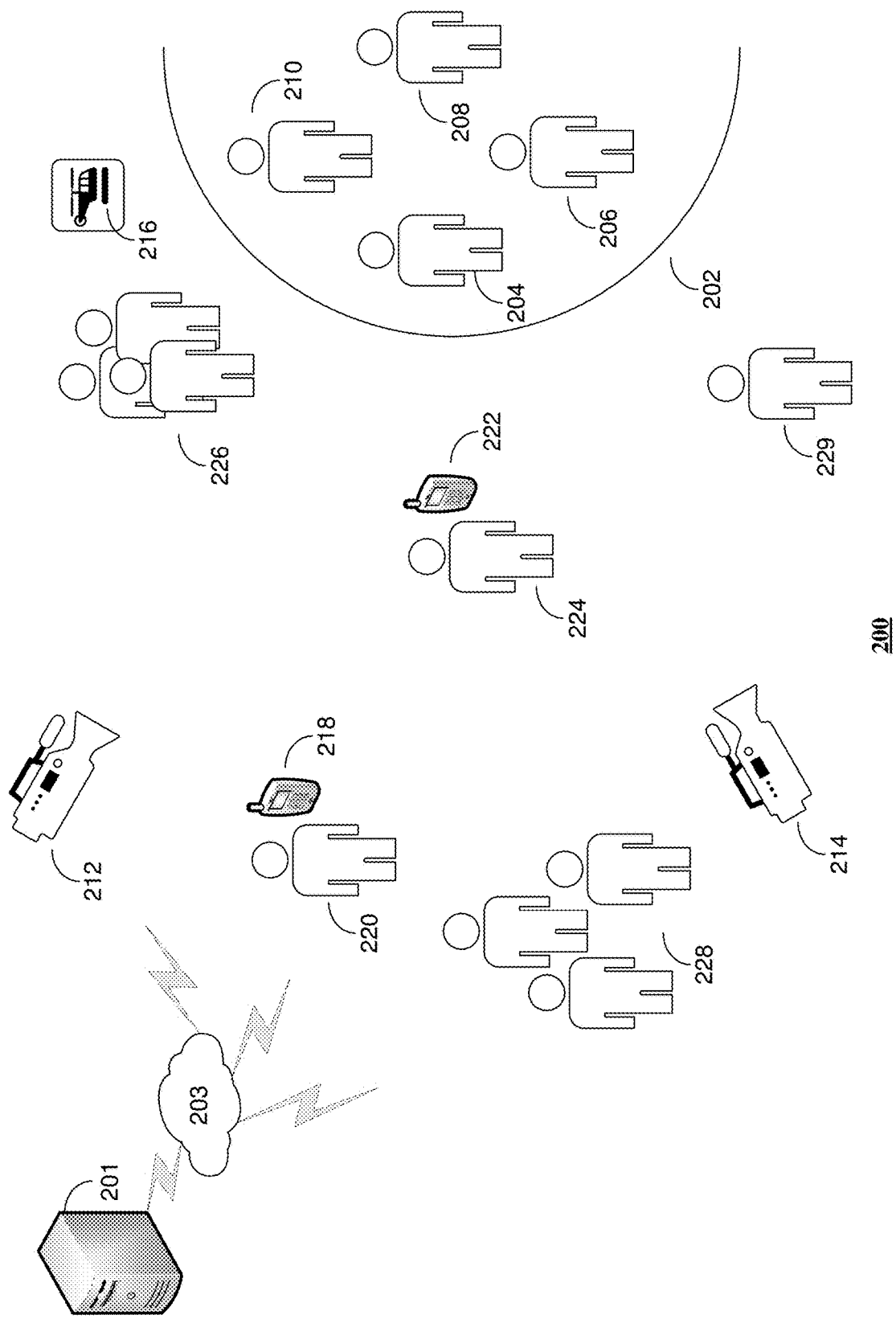

Referring to FIG. 2A, in one or more embodiments, the system 200 can include a group of cameras 212, 214 that are capturing images or video content of a live event such as a concert 202. The concert 202 can be of a musical group comprising musicians 204, 206, 208, 210. Further, there may be a group of audience members 220, 224, 226, 228, 229 that are viewing the concert 202. Some of the audience members can 220, 224 can capture images or video content of the concert 202 using mobile devices 218, 222. In addition, the system 200 can include a drone 216 comprising a camera that can capture images or video content of the concert 202. The images or video content captured by the group of cameras 212, 214, mobile devices 218, 222, and the drone 216 can be provided to a server 201 over a communication network. In some embodiments, the video content can be provided to the server 201 as a group of video content streams. The mobile devices 218, 222 can be a mobile phone, tablet computer, laptop computer, smartwatch, Internet of Things (IoT) device, wearable device, or any other portable computing device. The communication network 203 can comprise a wireless communication network, a wired communication network, or a combination thereof.

Figure 2B:
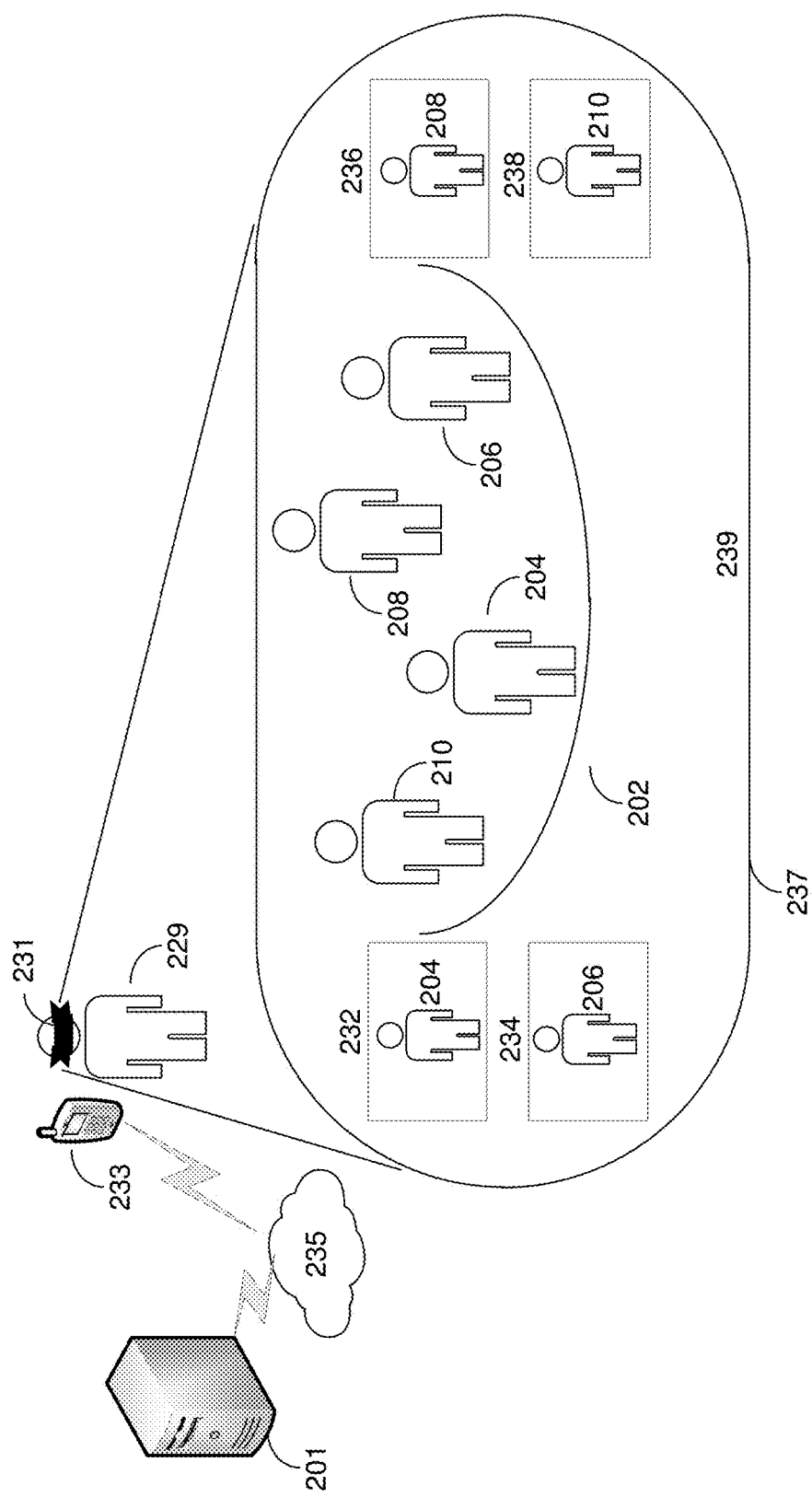

Referring to FIG. 2B, in one or more embodiments, a computing device associated with an audience member/user 229 can obtain a group of video content streams from the server 201 over a communication network 235. The computing device can be a mobile device 233 or an augmented reality (AR) device 231, any other communication device, or a combination thereof. The communication network 235 can comprise a wireless communication network, a wired communication network, or combination thereof. In additional embodiments, the server 201 can provide aggregate video content for the concert such that the aggregate video content can be an aggregation of a group of video content streams. In further embodiments, the user 229 can view the group of video content streams for the concert 202 using the computing device. The user can view a display 237 of the computing device that presents a video content stream of the concert 202 on a main display 239, and several other video streams of the live concert 202 on different secondary displays 232, 234, 236, 238. In some embodiments, each secondary display 232, 234, 236, 238 can present the video streams of a musician 204, 206, 208, 210 performing at the concert 202. In other embodiments, the group of video streams presented on the main display 239 and secondary displays 232, 324, 236, 238 can be presented in real-time or time-delayed. In further embodiments, the server 201 can add relevant overlaid content to the real-time video content (or data collection from the audience) presented on main display 239, and/or secondary displays 232, 234, 236, 238.

Figure 2C:
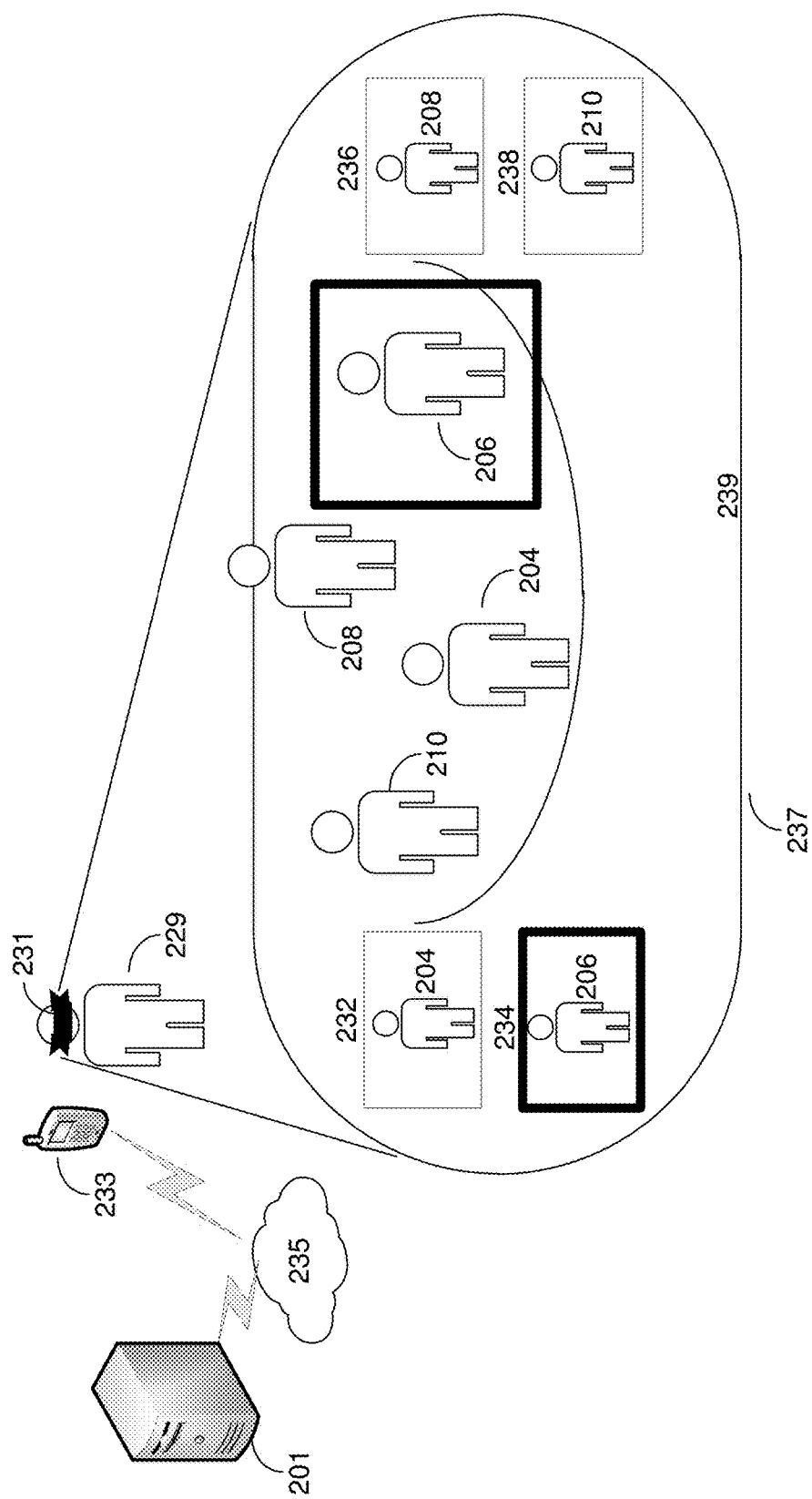

Referring to FIG. 2C, in one or more embodiments, the server 201 can determine a point of view of the group of audience members 220, 224, 226, 228, 229 for the concert 202. For example, the point of view of the group of audience members 220, 224, 226, 228, 229 can be of one musician 206 (e.g., a guitarist playing a solo of a song). Further, the server 201 can select a portion of the group of video streams captured and provided by the different cameras 212, 214, 216, 218, 222 at the concert 202 according to the point of view of the group of audience members 220, 224, 226, 228, 229. For example, the video streams captured and provided by camera 214 and mobile device 222 can be focused on musician 206. In addition, the server 201 can aggregate the portion of the group of video content streams and generate augmented reality content from the aggregated video content. Also, the server 201 can provide the augmented reality content to the computing device. Further, the computing device can display the augmented reality content that can include marking the musician 206 in the video content presented in the main display 239 as well as marking the musician 206 on a secondary display 234.

In one or more embodiments, the server 201 can instruct the display 237 (automatically based on a significant portion of the audience focusing their point of view on the musician 206 is above a threshold (as described herein) or based on user-generated input from the user 229) to replace the content on the main display from the entire musical group but of only musician 206 and have content showing the entire musical group to be on a secondary screen 234.

In one or more embodiments, further augmentation of the content can include providing biographical information of members of the musical group or the venue as text overlaid on the main display 239. Other augmentation of the content can include providing a chat window overlaid on the main display 239 such that a user 229 can interact with other users to discuss the concert of the musical group over a social media network.

Figure 2D:
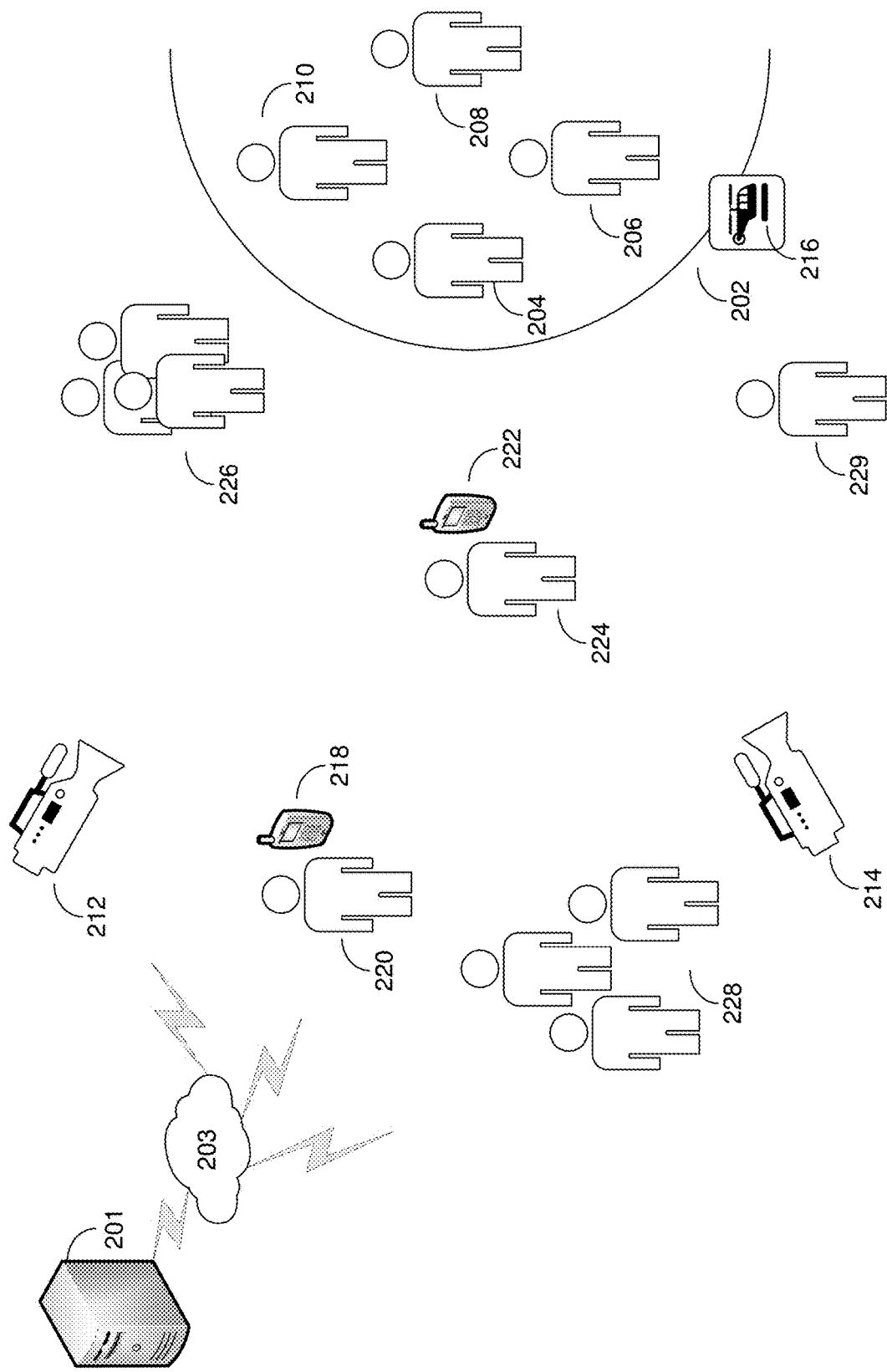

Referring to FIG. 2D, in one or more embodiments, if the number of audience members whose point of view is directed to a certain object (e.g., musician 206) is above a threshold, the server 201 can direct certain IoT devices to adjust their position to record further information regarding the object. For example, the server 201 can detect a six out of nine members of the audience (e.g., audience members 220, 224, 228, 229) are viewing musician 229) and the threshold for the adjusting the position of an IoT device based the point of view of a significant portion of audience members can be 60% of audience members. Thus, as over 60% (e.g., 66%) of the audience members are viewing musician 206, the server 201 can adjust the position of an IoT device such as drone 216 to capture close-up images of the musician 206 to be aggregated with other video content and provided to users as augmented reality content.

Referring to FIG. 2E, in one or more embodiments, a scene 240 can be of an emergency situation such as an office building 242 on fire 244, 246. Further, emergency personnel 250, 258 and news reporter 254 can be on the scene 240. Further, a drone 256 that is communicatively coupled to a camera can be on the scene 240, which can be remotely controlled by emergency personnel 250, 258. The emergency personnel 250 and the news reporter 254 can each have a mobile phone 248, 252. Each mobile phone 248, 252 can include a camera. Each of the mobile phones 248, 252 and drone can capture video content and provide the captured video content to a server 201 over a communication network 203. The captured video content can be a video content stream. In some embodiments, the office building 242 can include sensors such as a temperature sensor, heat sensor, motion sensor, an environment sensor, or any combination thereof. These sensors can provide sensor information to the server 201 over communication network 203 that can be used to generate heat maps. Further, the heat maps can be used by emergency personnel 250, 258 determine locations of different portions of the fire 244, 246, and to allocate emergency personnel and emergency resources to the fire 244, 24, accordingly.

Figure 2F:
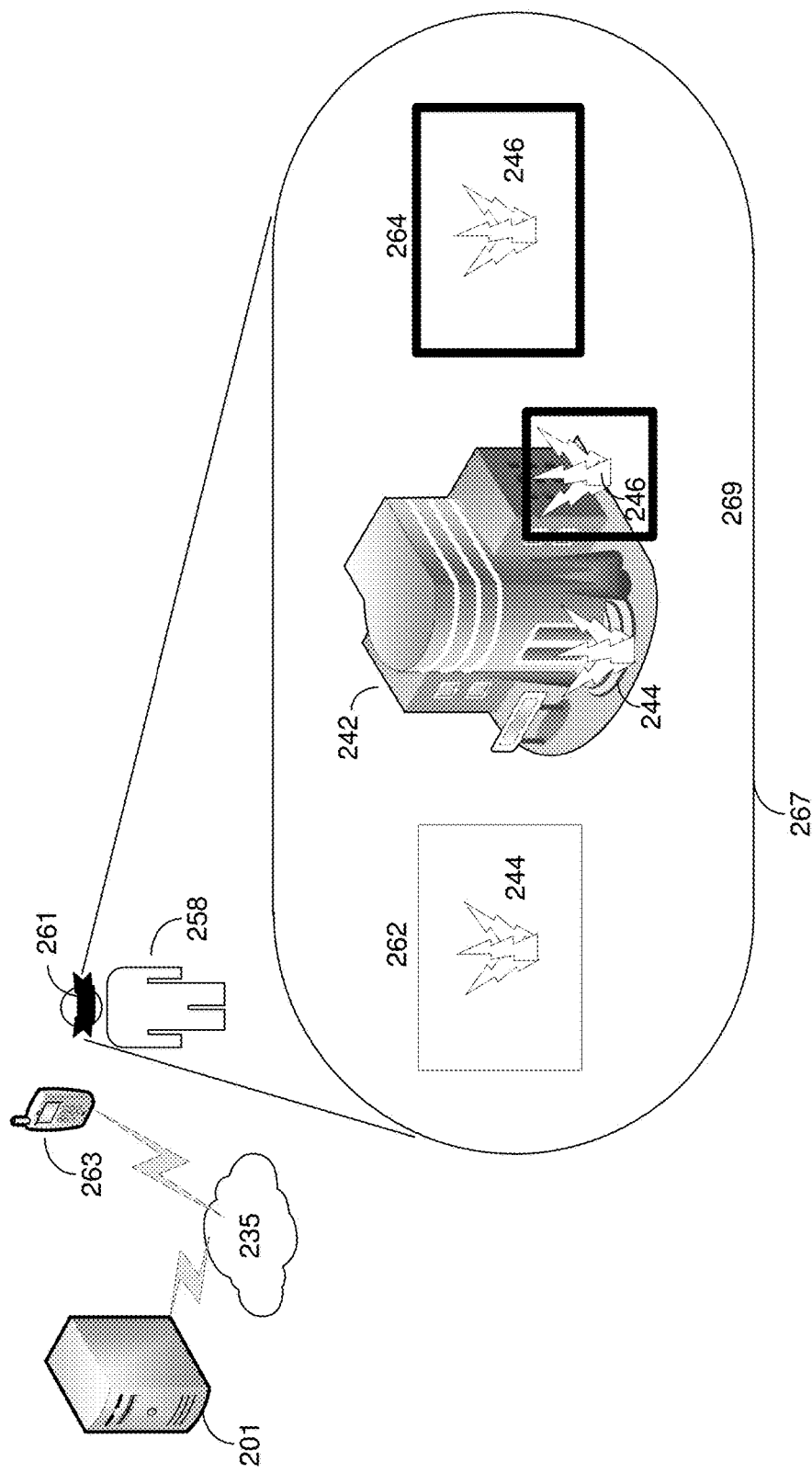

Referring to FIG. 2F, in one or more embodiments, a computing device associated with emergency personnel/user 258 can obtain a group of video content streams from the server 201 over a communication network 235. The computing device can be a mobile device 263 or an augmented reality (AR) device 261, or a combination thereof. The communication network 235 can comprise a wireless communication network, a wired communication network, or combination thereof. In further embodiments, the user 258 can view the group of video content streams of the office building 242 on fire 244, 246 using the computing device. The user 258 can view a display 267 of the computing device that presents a video content stream of the office building 242 on fire 244, 246 on a main display 269, and several other video streams of the fire 244, 246 on different secondary displays 264, 265. In other embodiments, the group of video streams presented on the main display 269 and secondary displays 264, 265 can be presented in real-time or time-delayed.

In one or more embodiments, the server 201 can determine that the emergency personnel 250, 258 and news report each have their point of view toward a portion of the fire 246. Thus, the server 201 can generate and provide augmented reality content to the computing devices that marks the portion of the fire 246 in both the main display 269 and a secondary display 246.

In one or more embodiments, the server 201 can generate augmented reality content that includes the sensor information gathered by office building 242 sensors discussed when describing FIG. 2E. In some embodiments, the augmented reality content can present the sensor information as text overlaid on the main display 260 presenting the video content of the fire 244, 246 on the office building 242 or as banner of information in a window separate from the main display. In additional embodiments, the augmented reality content can include heat maps based on the sensor information that is overlaid on the video content presented on the main display 269. The sensor information displayed (either as overlaid text or as heat maps) can be used by emergency personnel to allocate other emergency personnel or emergency resources (e.g., fire trucks) to address a portion of the fire 246, accordingly.

Figure 2G:
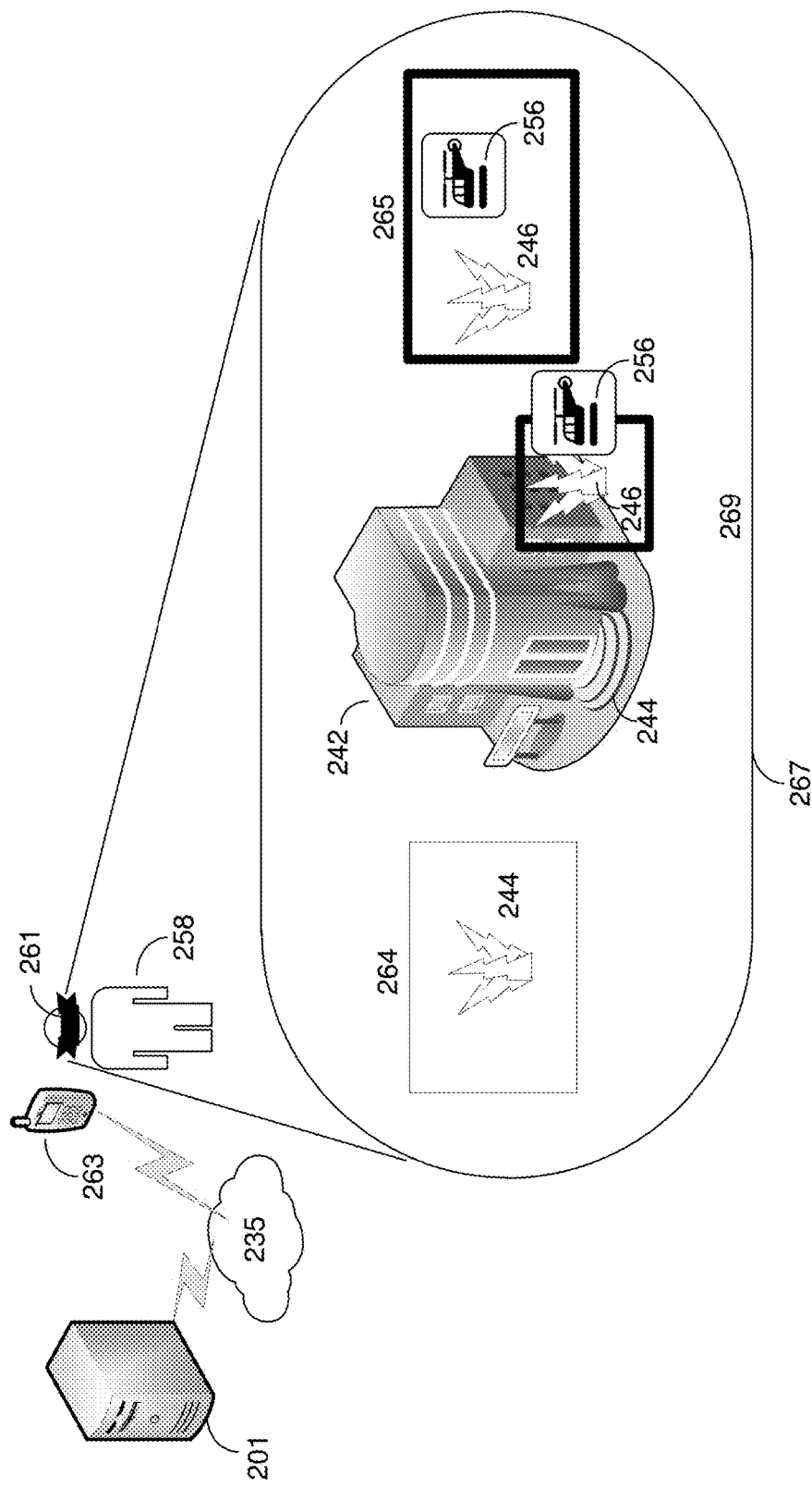

Referring to FIG. 2G, in one or more embodiments, the server 201 can determine an area of interest because the server 201 recognizes using image recognition techniques that a portion of the fire 246 is not being addressed by emergency personnel. The server 201 can generate and provide augmented reality content on the main display 269 marking the portion of the fire 246. Further, the server 201 can adjust the position of the drone 256 to be moved closer to the portion of the fire 246 capture close-up images of the portion of the fire 246. In some embodiments, the augmented reality content can include a message on the main display to indicate to the emergency personnel 258 that he or she may need to deploy additional emergency personnel and/or emergency resources to address the portion of the fire 246. Further, a chat window may be overlaid onto the main display 269 for the emergency personnel 250 to interact with other emergency personnel to deploy emergency resources to the portion of the fire 246.

Figure 2H:
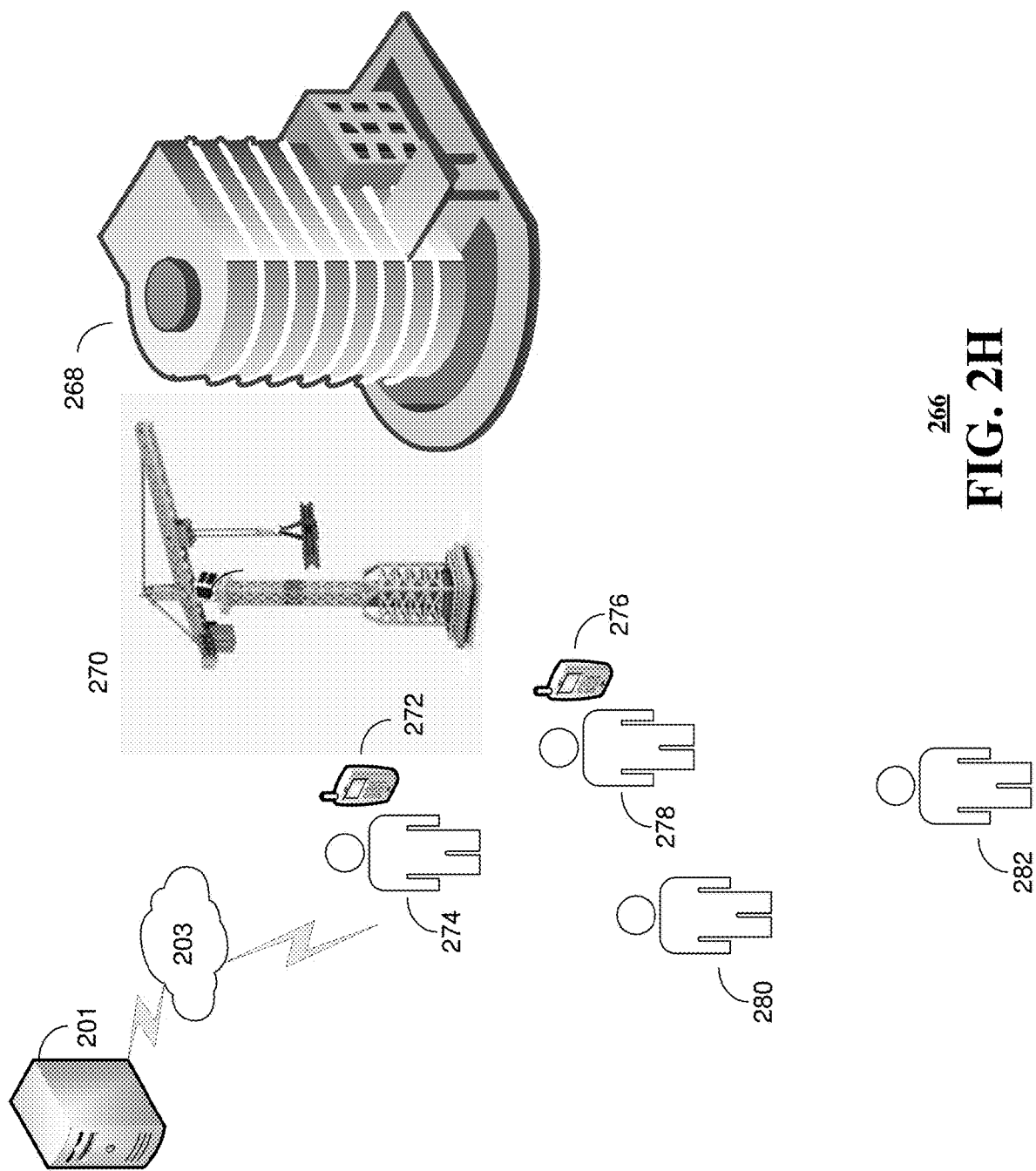

Referring to FIG. 2H, in one or more embodiments, a scene 266 can be of a construction site such as the construction of an office building 268. Further, a crane 270 may be used to carry and place construction materials within the construction site. The crane 270 can be an IoT device that can be controlled remotely by one or more construction personnel. In addition, construction personnel 274, 278, 280, and 282 can be onsite observing the crane 270 carrying and placing construction materials. Some construction personnel 274, 279 can each have a mobile phone 272, 276. Each mobile phone 272, 276 can include a camera. Each of the mobile phones 272, 276 can capture video content and provide the captured video content to a server 201 over a communication network 203. The captured video content can be a video content stream.

Referring to FIG. 2I, in one or more embodiments, a computing device associated with construction personnel/users 280,282 can obtain a group of video content streams from the server 201 over a communication network 235. The computing device can be a mobile device 281, 283 or an augmented reality (AR) device 285,287, or a combination thereof. The communication network 235 can comprise a wireless communication network, a wired communication network, or combination thereof. In further embodiments, the users 280,282 can view the group of video content streams of the construction site 268 using the computing device. The users 280, 282 can view a display 291 of the computing device that presents a video content stream of the construction site 268 on a main display 286, and several other video streams of the construction site 268 on different secondary displays 288, 290. In other embodiments, the group of video streams presented on the main display 286 and secondary displays 288, 290 can be presented in real-time or time-delayed.

In one or more embodiments, the display 291 of the computing device can include augmented reality content that can include a first controller 292 associated with construction personnel 280 and a second controller 294 associated with construction personnel 282. The first controller 292, 294 can control the movement of the crane 270 on the construction site. The construction personnel 280, 282 can work together remotely to control the crane 270 to carry and place the construction material within the office building. Further, the display 291 include both the first controller 292 and second controller 294 so that each construction personnel 280, 282 understand what the other is doing in terms of controlling the crane. In some embodiments, construction personnel 280 can control the crane movements in an up/down directions, and construction personnel 282 can control the crane movements in left/right directions. In further embodiments, the first controller 292 and second controller 294 can receive user-generated input from construction personnel 280, 282 through voice input, hand gestures, graphical user interface, or any other user interface. In yet another embodiment, control 292 and 294 can receive commands from the server 201 based on aggregated views from users 280 and 282. Here, these control commands can be re-weighted or adjusted from user input from personnel 280, 282 or semi-automated control commands based on the needs of user 280 and 282 to see different parts of the construction site 268. For example, the individuals can move around the site 268 causing a semi-automated control of 292 or 294 to rotate, lift, or move a beam for better visibility or positioning. In this embodiment, neither user 280 or 282 needed to calibrate the system individually because views and perspectives were processed by augmented reality systems 285, 287.

Figure 2J:
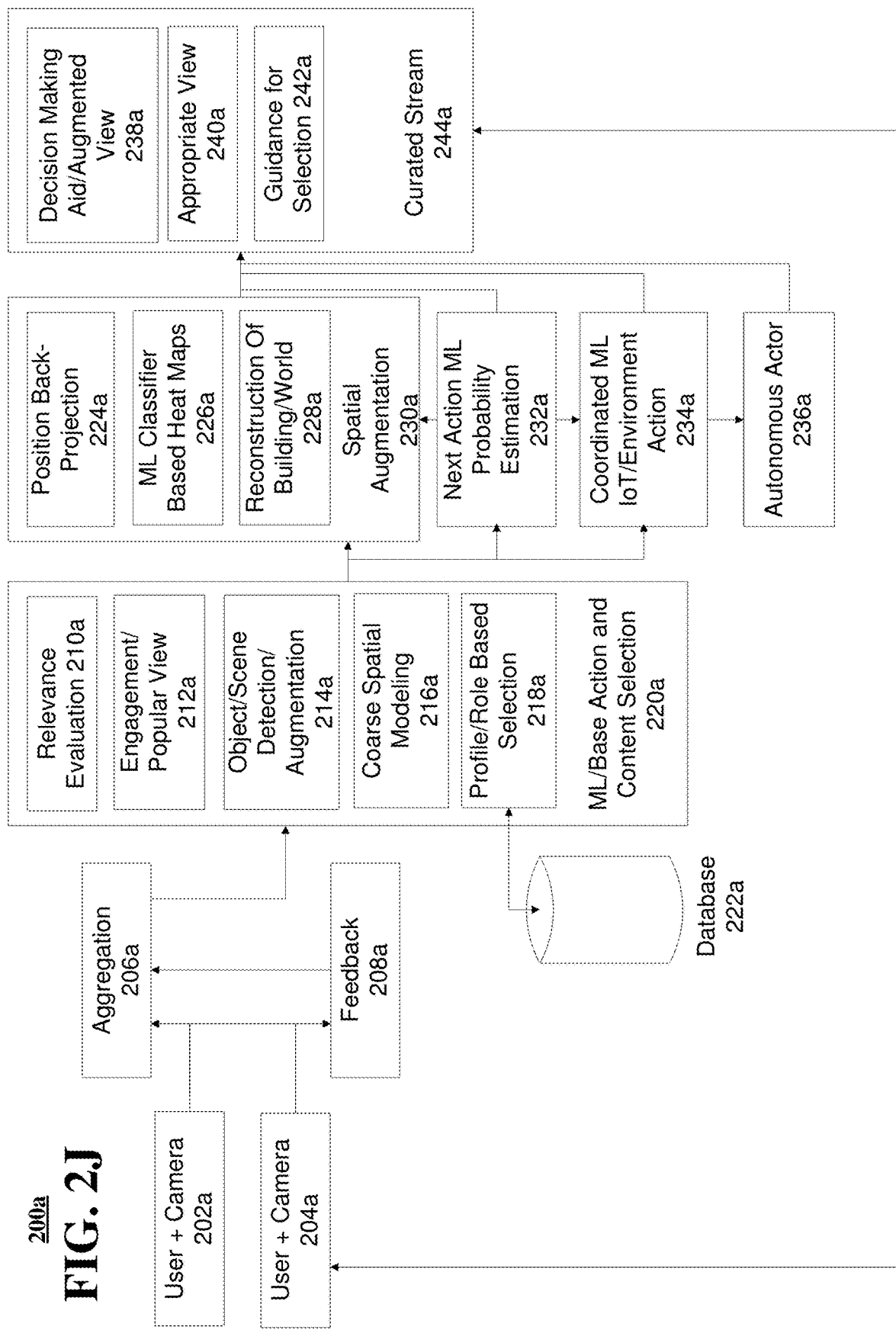

Referring to FIG. 2J, system 200a provides AR capability, guided autonomous action capability, and next state prediction capability as described herein. Further, the AR capability, guided autonomous action capability, and next state prediction capability can be implemented using machine learning techniques. AR capability can include generating and providing augmented reality content. Guided autonomous capability can include adjusting position of sensors, cameras, drones and other IoT devices due to identification of objects in video content based on audience member point of view. Next state prediction capability can include predicting a next state based on analyzing video content using machine learning techniques and adjusting IoT devices based on the predicted next state (adjust camera position, configure sensor, etc.). The system 200a can comprise a server (as shown in FIGS. 2A-2I) with a processing system including a processor or the system can comprise a group of such servers each of which implement a portion of the components described herein. The components of system 200a can be software applications implemented by hardware such as the processing system including the processor that implement a particular function.

The system 200a can include a plurality of users/cameras 202a, 204. The cameras can be part of a mobile device such as a mobile phone, tablet computer, or drone. Each user/camera 202a, 204a can capture a video content stream (or a group of images) and provide each video content stream to an aggregation component 206a, which has the function of aggregating the video content provided by each user/camera 202a, 204a. Further, a feedback component 208a that also receives video content from the user/cameras 202a, 204a can function as providing feedback to the aggregation component 206a to process or adjust the aggregation of the video content according to the feedback. Such feedback can be from user-generated input or discerned from machine learning techniques. The aggregated video content can be provided by the aggregation component 206a to the machine learning (ML)/base action and content selection component 220a.

In one or more embodiments, the ML/base action and content selection component 220a functions to select content within the aggregated video content or determine actions to implement based on analyzing the aggregated video content using machine learning techniques. Also, the selected content or determined actions can be used to generate augmented reality content. Further, the ML/base action and content selection component 220a can comprise a relevant evaluation component 210a, engagement/popular video component 212a, object/scene detection/augmentation component 214a, coarse spatial modeling component 216a, and profile/role based selection component 218a that retrieves data from a database 222a.

The relevance evaluation component 210a can analyze the aggregated video content to determine relevant objects or other content within the aggregated video content to be selected to be possibly used in generating augmented reality content from the aggregated video content. The engagement/popular view component 212a can analyze the aggregated video content to determine objects or content that may be popular within the aggregated video content. Such a determination can be done by analyzing the points of view of users capturing video content using cameras. Popular objects or content can be used to generate augmented reality content. The object/scene detection/augmentation component 214a can detect objects or scenes of the aggregated video content that should be used to generate augmented reality content based on the relevance evaluation component 210a and the engagement/popular view component 212a. The coarse spatial modeling component 216a can model the augmented reality content that can be generated from the aggregated video content. Persistent output of the coarse spatial modeling component 216a may be a virtual object representations (e.g. spheres, cubes, wireframes, images, volumetric videos, avatars, building models, objects in generic forms) that are anchored to real-world, physical environment locations (e.g. the basketball player avatar is anchored to the basketball court at a real position or the volumetric video of a fire is anchored to the roof of a building). This can include marking relevant or popular objects as determined by the relevance evaluation component 210a or the engagement/popular video content 212a. The profile/role based selection component 218a can access, from database 222a, profile of people identified in aggregated video content that may be associated with relevant or popular objects. Also, the profile/role based selection component 218a can access, from database 222a, profile of IoT devices identified in aggregated video content that may be associated with relevant or popular objects. For example, the aggregated video content can include video content of wildfire being battled by first responders. In the aggregated video content, a first responder can be identified that may be directed to evacuate residents from their homes within an area in proximity to the wildfire. Further, a drone can be identified in the aggregated video content that can be directed to be positioned closer to the wildfire to capture close-up images of the wildfire. In addition, the ML/base action and content selection component 220a can identify the first responder and the drone using image recognition techniques then access profiles of the first responder and the drone from the database 222a. Based on the analysis of the different components of the ML/base action and content selection component 220a, data is provided to the spatial augmentation component 230a, the next action ML probability estimation component 232a, the coordinated ML IoT/environment action component 234a, and the optional autonomous actor component 236a. This data can be indications of relevant objects and content within the aggregated video content, popular objects and content within the aggregated video content, detected scenes that contain the relevant/popular objects or content, a course spatial mode, and selected profiles of personnel or IoT devices identified within the aggregated video content.

The spatial augmentation component 230a can generate augmented reality content from the aggregated video content. Further, the spatial augmentation component 230a can include the position back-projection component 224a, ML classifier based heat maps component 226a, and a reconstruction of building/world component 228a. The position back-projection component 224a can overlay text or mark objects within the aggregated video content and align the views of multiple video content sources to an augmented reality content view. The ML classifier based heat maps components 226a can overlay heat maps on the aggregated video content, which may be needed in an emergency situation such as a wildfire. The heat maps can be determined from sensor information obtained by the server implementing the system 200a from sensors located within the area of the event within the captured video content provided by the user/cameras 202a, 204a. The reconstruction of building/world component 228a can generate augmented reality content that is anchored to a real-world view or real-world content from the position back-projection component 224a and ML classifier based heat maps component 226a as well as generate multiple displays and assign video content to each of the multiple displays from the aggregated video content. All the information and augmented reality content can be provided to the curated stream component 244a.

The next action ML probability estimation component 234a can determine a next action by actors within the aggregated video content and select video streams from the aggregated video content that can include video content relevant or pertaining to the next action. For example, if building materials are loaded onto a crane for an office building, the next action ML probability estimation component 234a can determine that a next action can be to have construction personnel to control the crane to navigate the building materials on the crane to an office building for construction. Thus, the next action ML probability estimation component 234a can provide video content of not only the crane carrying the building materials but also the predicted landing area for the building materials within the office building. Further, the next action ML probability estimation component 234a can provide information to curated stream component 244a to provide augmented reality aspects such as controllers for construction personnel to control the crane and displays of both the crane and the landing area for the materials.

The coordinated ML IoT/Environment action component 234a can determine or identify IoT devices to adjust due to the aggregated video content. For example, a drone's position can be adjusted so that it can capture close-up images of a wildfire. In other embodiments, a sensor located within an office building on fire can be configured to better record information relating to the fire (temperature, heat, motion, etc.). Such coordinated ML IoT/Environment action can be provided to the curated stream component.

An autonomous actor component 236a can identify actors such as first responders and generate instructions for such actors and provide them to the curated stream component 244a. Instruction can include adjusting the position of first responders to better respond to a wildfire.

The curated stream component 244a can include a decision making aid/augmented view component 238a, appropriate view 240a component, and a guidance for selection component 242a and can process data from the spatial augmentation component 230a, next action ML probability estimation component 232a, coordinated ML IoT/Environment action component 234a, and autonomous actor component 236a to generate augmented reality content. The decision making aid/augmented view component 238a can include generating augmented reality content that pertains to instructions for an actor, controls for an IoT device, chat window overlay, or any other decision making tools that can be provided in the augmented reality content to aid an actor in making a decision (e.g., adjusting the position of IoT devices). The appropriate view component 240a can determine, based on the data received from the spatial augmentation component 230a, next action ML probability estimation component 232a, coordinated ML IoT/Environment action component 234a, and autonomous actor component 236a, appropriate views to provide in the curated stream. For example, the appropriate view component 240a can determine the content displayed on a main display and the content on each of a group of secondary displays based on the points of view of people on the scene of the event. The guidance for selection component 242a can provide augmented reality content to guide an actor to select an action. For example, guidance of selection of actions can include adjusting the position of IoT devices, configuring IoT devices, controlling IoT devices, providing instructions to other actors, etc. The curated stream components 244a can provide augmented reality content from the aggregated video content to the users 202a, 204a or other actors, accordingly.

Figure 2K:
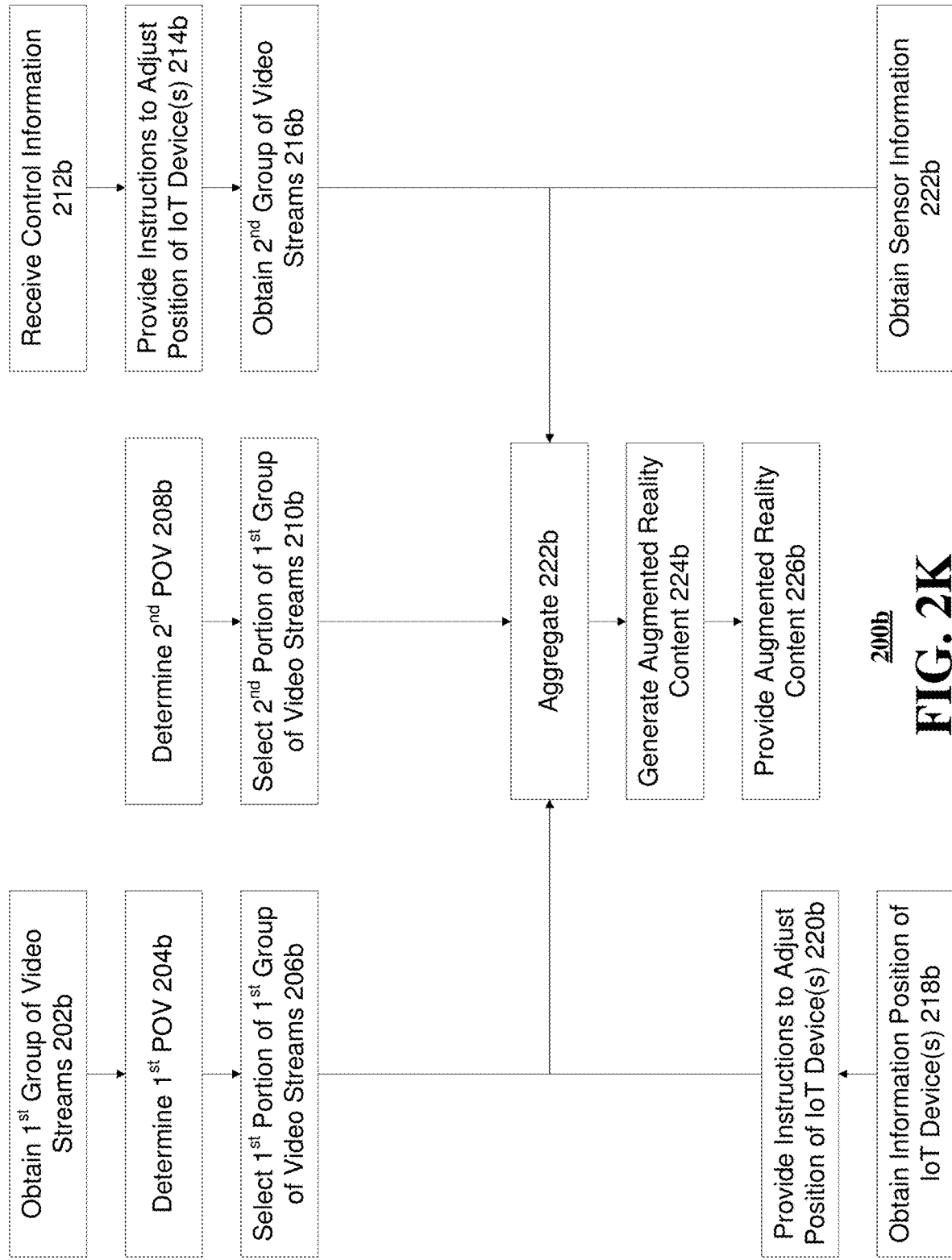
FIG. 2K depicts an illustrative embodiment of a method in accordance with various aspects described herein.

FIG. 2K depicts an illustrative embodiment of a method 200b in accordance with various aspects described herein. In one or more embodiments, the method 200b can be implemented by a server as shown in FIGS. 2A-2I and the system in FIG. 2J. Further, the method 200b can include the server, at 202b, obtaining a first group of video content streams of an event. In addition, the method 200b can include the server, at 204b, determining a first point of view of a plurality of audience members of the event. Also, the method 200b can include the server, at 206b, selecting a first portion of the first group of video content streams of the event according to the first point of view of the plurality of audience members. Further, the method 200b can include the server, at 222b, aggregating the first portion of the first group of video content streams resulting in first aggregated video content. In addition, the method 200b can include the server, at 224b, generating first augmented reality content from the first aggregated video content according to the first point of view. Also, the method 200b can include the server, at 226b, providing the first augmented reality content to a communication device. The communication device presents the first augmented reality content.

In one or more embodiments, the method 200b can include the server, at 208b, determining a second point of view of the plurality of audience members of the event according to machine learning techniques. Further, the method 200b can include the server, at 210b, selecting a second portion of the first group of video content streams of the event according to the second point of view of the plurality of audience members. In addition, the method 200b can include the server, at 222b, aggregating the second portion of the first group of video content streams resulting in aggregated video content. Also, the method 200b can include the server, at 224b, generating augmented reality content from the aggregated video content according to the second point of view. Further, the method 200b can include the server, at 226b, providing the augmented reality content to the communication device. The communication device presents the augmented reality content.

In one or more embodiments, the method 200b can include the server, at 212b, receiving control information for a first group of IoT device(s). For example, the server can receive or obtain control information for adjusting the position of a drone comprising a camera to capture images of one or more objects. Further, the method 200b can include the server at 216b, providing instructions to the first group of Internet of Things (IoT) devices according to the first point of view of the plurality of audience members and/or the control information. For example, the server can provide instructions to adjust the position of the drone according to the control information. The first group of IoT devices (e.g., drone) can be positioned according to the first point of view and/or the control information based on the instructions. In addition, the method 200b can include the server, at 216b, obtaining a second group of video content streams that can include the first group of IoT devices (e.g., drone can comprise a camera). Also, the method 200b can include the server, at 222b, aggregating the first portion of the first group of video content streams and the second group of video content streams resulting in aggregated video content. Further, the method 200b can include the server, at 224b, generating augmented reality content from the aggregated video content according to the first point of view and/or the control information. In addition, the method 200b can include the server, at 226b, providing the augmented reality content to the communication device. The communication device presents the augmented reality content. For example, the augmented reality content can include text information regarding objects within the images captured by the drone.

In one or more embodiments, the method 200b can include the server, at 218b, obtaining information position of IoT device(s). Further, the method 200b can include the server, at 220b, providing instructions to adjust the position of the IoT device(s). The adjustment can be due to determining that a number of users viewing an object are above a threshold and the position of the IoT device(s) is adjusted to provide additional information of the object (obtain sensor information, capture additional images, etc.). For example, the server can determine that a significant portion of an audience members of a sporting event are viewing an object (e.g., ball, player, goal, etc.) and may adjust the position of a drone that comprises a camera to capture close-up images of the object. Also, the method 200b can include the server, at 222b, aggregating the first portion of the first group of video content streams and the second group of video content streams resulting in aggregated video content. Further, the method 200b can include the server, at 224b, generating augmented reality content from the aggregated video content. For example, the augmented reality content can include marking the object. In addition, the method 200b can include the server, at 226b, providing the augmented reality content to the communication device. The communication device presents the augmented reality content.

In one or more embodiments, the method 200b can include the server, at 222b, obtaining a first group of sensor information from a first group of IoT devices. For example, the sensor information can be temperature information from a group of temperature sensors located in an office building on fire. Also, the method 200b can include the server, at 222b, aggregating the first portion of the first group of video content streams and the second group of video content streams resulting in aggregated video content. Further, the method 200b can include the server, at 224b, generating augmented reality content from the aggregated video content according to the sensor information. For example, the augmented reality content can include heat maps based on the temperature information. In addition, the method 200b can include the server, at 226b, providing the augmented reality content to the communication device. The communication device presents the augmented reality content.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, it is understood and appreciated that portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 230 presented in FIGS. 1, 2A, 2B, 2C, and 3. For example, virtualized communication network 300 can facilitate in whole or in part obtaining video content streams of a live event, determining a point of view of audience members of the live event, and generating augmented reality content from the aggregation of the video content streams according to the point of view.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
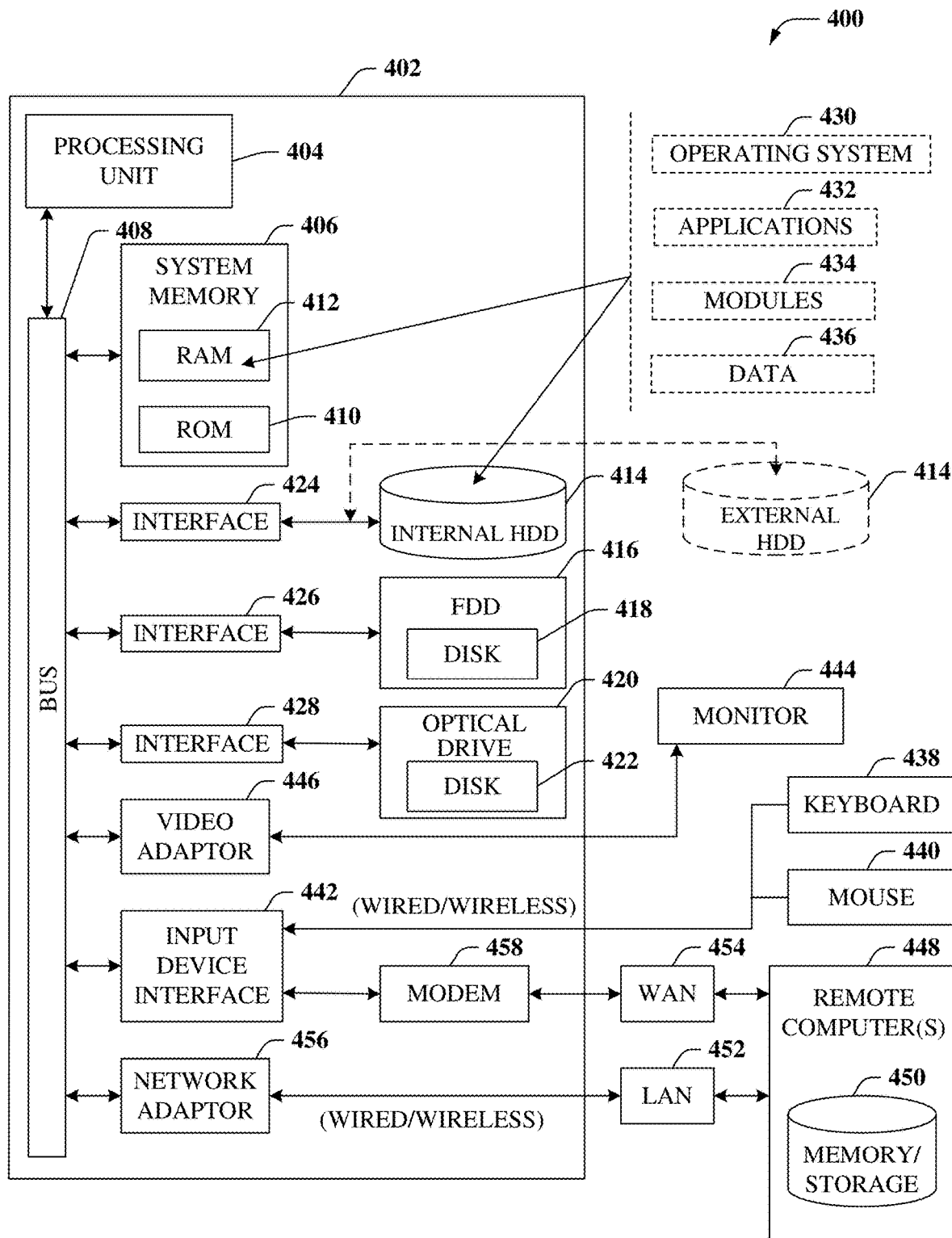
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining video content streams of a live event, determining a point of view of audience members of the live event, and generating augmented reality content from the aggregation of the video content streams according to the point of view. The servers, cameras, mobile devices, drones, augmented reality devices, IoT devices, and systems can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
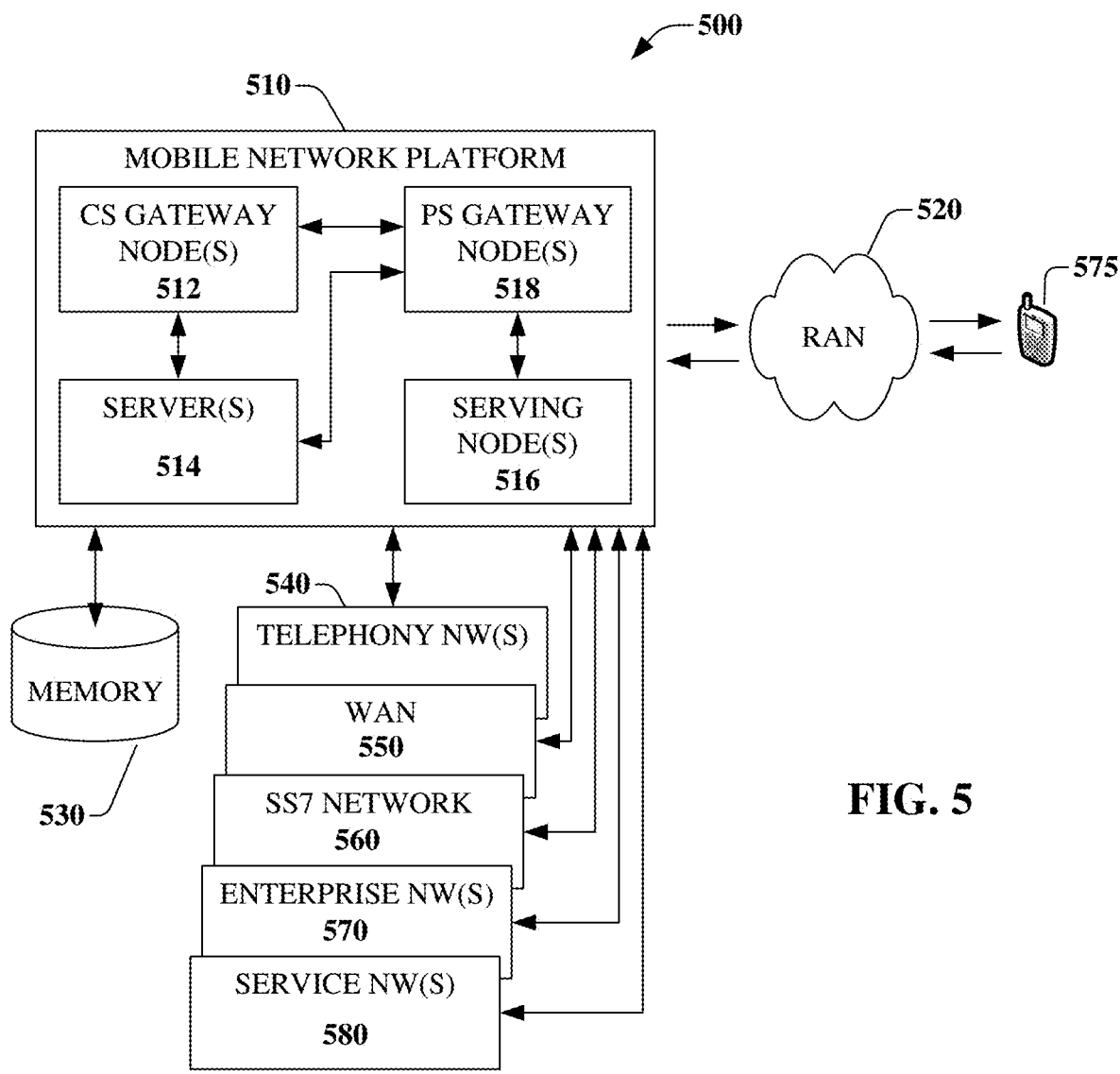
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining video content streams of a live event, determining a point of view of audience members of the live event, and generating augmented reality content from the aggregation of the video content streams according to the point of view. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
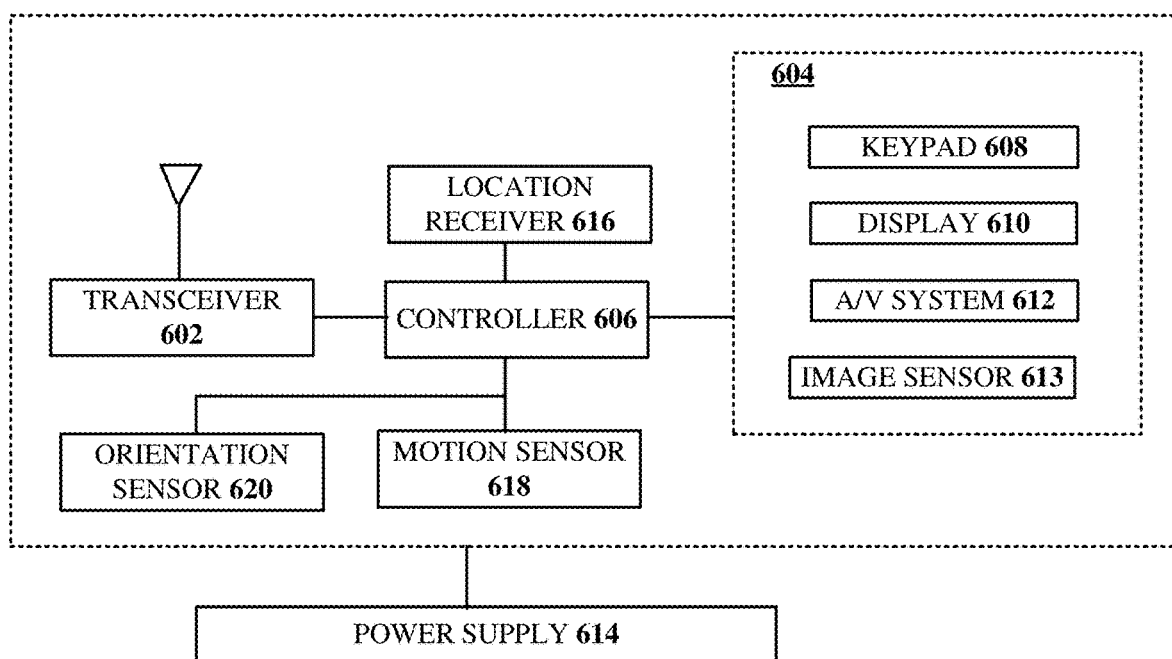
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining video content streams of a live event, determining a point of view of audience members of the live event, and generating augmented reality content from the aggregation of the video content streams according to the point of view. The servers, cameras, mobile devices, drones, augmented reality devices, IoT devices, and systems can comprise computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, a machine learning model can be employed to determine a ranking or priority of each cell site of the acquired network. A machine learning model can be a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a machine learning model that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ machine learning models that are explicitly trained (e.g., via a generic training data) as well as implicitly trained (e.g., via observing UE behavior, operator preferences, historical information, receiving extrinsic information). For example, SVMs can be configured via a learning or training phase within a machine learning model constructor and feature selection module. Thus, the machine learning model(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        obtaining a first group of video content streams of an event, the event having a plurality of participants;
        determining a first point of view of a plurality of audience members of the event;
        selecting a first portion of the first group of video content streams of the event according to the first point of view of the plurality of audience members;
        aggregating the first portion of the first group of video content streams resulting in first aggregated video content;
        generating first augmented reality content from the first aggregated video content according to the first point of view;
        providing the first augmented reality content to a communication device, wherein the communication device presents the first augmented reality content by displaying the first augmented reality content on a display of the communication device, wherein in accordance with the first point of view being of a subset of the plurality of participants, the displaying comprises marking the participants in the subset of the plurality of participants; and
        providing instructions to a first group of Internet of Things (IoT) devices to obtain information regarding an object, in accordance with a portion of the plurality of audience members having the first point of view directed at the object, the portion exceeding a predetermined threshold,
        wherein at least one of the first group of IoT devices is positioned, according to the instructions, to capture a close-up image of the object.

2. The device of claim 1, wherein the operations further comprise obtaining a first group of sensor information from the first group of IoT devices.

3. The device of claim 1, wherein the operations further comprise:
    obtaining a second group of video content streams from the first group of IoT devices;
    aggregating the first portion of the first group of video content streams and the second group of video content streams resulting in second aggregated video content;
    generating a second augmented reality content from the second aggregated video content; and
    providing the second augmented reality content to the communication device, wherein the communication device presents the second augmented reality content.

4. The device of claim 2, wherein the operations further comprise:
    generating a third augmented reality content from the first aggregated video content and the first group of sensor information; and
    providing the third augmented reality content to the communication device, wherein the communication device presents the third augmented reality content.

5. The device of claim 1, wherein each of the first group of IoT devices comprise a drone with a video camera to capture a video content stream.

6. The device of claim 1, wherein each of the first group of IoT devices comprises a sensor to capture a portion of sensor information.

7. The device of claim 6, wherein the sensor comprises one of a temperature sensor, heat sensor, motion sensor, an environment sensor, or any combination thereof.

8. The device of claim 1, wherein the communication device comprises a mobile device.

9. The device of claim 1, wherein the operations further comprise:
    determining a second point of view of the plurality of audience members of the event according to machine learning techniques;
    selecting a second portion of the first group of video content streams of the event according to the second point of view of the plurality of audience members;
    aggregating the second portion of the first group of video content streams resulting in third aggregated video content;
    generating fourth augmented reality content from the third aggregated video content; and
    providing the fourth augmented reality content to the communication device, wherein the communication device presents the fourth augmented reality content.

10. A non-transitory machine-readable medium, comprising executable instructions that, when executed by a processing system including a processor, facilitate performance of operations, the operations comprising:
    obtaining a first group of video content streams of an event, the event having a plurality of participants;
    determining a first point of view of a plurality of audience members of the event;
    selecting a first portion of the first group of video content streams of the event according to the first point of view of the plurality of audience members;
    obtaining a second group of video content streams from a first group of Internet of Things (IoT) devices;
    aggregating the first portion of the first group of video content streams and the second group of video content streams resulting in first aggregated video content;
    generating a first augmented reality content from the first aggregated video content according to the first point of view;
    providing the first augmented reality content to a communication device, wherein the communication device presents the first augmented reality content by displaying the first augmented reality content on a display of the communication device, wherein in accordance with the first point of view being of a subset of the plurality of participants, the displaying comprises marking the participants in the subset of the plurality of participants; and
    providing instructions to the first group of IoT devices to obtain information regarding an object, in accordance with a portion of the plurality of audience members having the first point of view directed at the object, the portion exceeding a predetermined threshold, wherein at least one of the first group of IoT devices is positioned, according to the instructions, to capture a close-up image of the object.

11. The non-transitory machine-readable medium of claim 10, wherein the operations further comprise obtaining a first group of sensor information from the first group of IoT devices.

12. The non-transitory machine-readable medium of claim 11, wherein the operations further comprise:

generating a second augmented reality content from the first aggregated video content and the first group of sensor information; and providing the second augmented reality content to the communication device, wherein the communication device presents the second augmented reality content.

13. The non-transitory machine-readable medium of claim 10, wherein each of the first group of IoT devices comprise a drone with a video camera to capture a video content stream.

14. The non-transitory machine-readable medium of claim 10, wherein each of the first group of IoT devices comprises a sensor to capture a portion of sensor information.

15. The non-transitory machine-readable medium of claim 14, wherein the sensor comprises one of a temperature sensor, heat sensor, motion sensor, an environment sensor, or any combination thereof.

16. The non-transitory machine-readable medium of claim 10, wherein the communication device comprises a mobile device.

17. A method, comprising:

obtaining, by a processing system including a processor, a first group of video content streams of an event, the event having a plurality of participants;

determining, by the processing system, a first point of view of a plurality of audience members of the event according to machine learning techniques;

selecting, by the processing system, a first portion of the first group of video content streams of the event according to the first point of view of the plurality of audience members;

obtaining a first group of sensor information from a first group of Internet of Things (IoT) devices;

aggregating, by the processing system, the first portion of the first group of video content streams and the first group of sensor information resulting in first aggregated video content;

generating, by the processing system, first augmented reality content from the first aggregated video content according to the first point of view;

providing, by the processing system, the first augmented reality content to a communication device, wherein the communication device presents the first augmented reality content by displaying the first augmented reality content on a display of the communication device, wherein in accordance with the first point of view being of a subset of the plurality of participants, the displaying comprises marking the participants in the subset of the plurality of participants; and providing, by the processing system, instructions to the first group of IoT devices to obtain information regarding an object, in accordance with a portion of the plurality of audience members having the first point of view directed at the object, the portion exceeding a predetermined threshold, wherein at least one of the first group of IoT devices is positioned, according to the instructions, to capture a close-up image of the object.

18. The method of claim 17, wherein each of the first group of IoT devices comprises a sensor to capture a portion of the first group of sensor information.

19. The method of claim 18, wherein the sensor comprises one of a temperature sensor, heat sensor, motion sensor, an environment sensor, or any combination thereof.

20. The method of claim 17, wherein the communication device comprises a mobile device.

* * * * *